US012085457B2

(12) United States Patent
Toda et al.

(10) Patent No.: US 12,085,457 B2
(45) Date of Patent: Sep. 10, 2024

(54) SENSOR MODULE AND STRAIN DETECTING DEVICE

(71) Applicant: MINEBEA MITSUMI Inc., Nagano (JP)

(72) Inventors: Shinya Toda, Kanagawa (JP); Atsushi Kitamura, Shizuoka (JP); Toshiaki Asakawa, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 316 days.

(21) Appl. No.: 17/753,450

(22) PCT Filed: Aug. 5, 2020

(86) PCT No.: PCT/JP2020/029965
§ 371 (c)(1),
(2) Date: Apr. 26, 2022

(87) PCT Pub. No.: WO2021/044796
PCT Pub. Date: Mar. 11, 2021

(65) Prior Publication Data
US 2022/0341790 A1    Oct. 27, 2022

(30) Foreign Application Priority Data
Sep. 5, 2019  (JP) .................... 2019-161965

(51) Int. Cl.
*G01K 7/16*      (2006.01)
*G01B 7/16*      (2006.01)
(52) U.S. Cl.
CPC ............. *G01K 7/16* (2013.01); *G01B 7/18* (2013.01)

(58) Field of Classification Search
CPC ..................................... G01K 7/16; G01B 7/18
See application file for complete search history.

(56) References Cited

U.S. PATENT DOCUMENTS

| 5,631,622 A | * | 5/1997 | Hauber ............... G01L 1/2287 156/247 |
| 2010/0166352 A1 | | 7/2010 | Morita et al. |
| 2012/0247237 A1 | | 10/2012 | Ishibashi et al. |
| 2020/0325571 A1 | | 10/2020 | Asakawa et al. |

FOREIGN PATENT DOCUMENTS

| EP | 1560010 B1 | * | 9/2009 | ........... G01G 3/1402 |
| JP | S57-103002 | | 6/1982 | |
| JP | H04-369403 | | 12/1992 | |
| JP | 57103002 A | * | 2/1995 | |
| JP | 2008-002591 | | 1/2008 | |
| JP | 2012-211868 | | 11/2012 | |
| JP | 2019-066311 | | 4/2019 | |
| JP | 2023138355 A | * | 10/2023 | |

OTHER PUBLICATIONS

International Search Report for PCT/JP2020/029965 mailed on Oct. 27, 2020.

* cited by examiner

*Primary Examiner* — Jamel E Williams
(74) *Attorney, Agent, or Firm* — IPUSA, PLLC

(57) ABSTRACT

A sensor module includes a first strain gauge including a first resistor, a second strain gauge including a second resistor, and a flexure element. The first strain gauge has the same characteristic as the second strain gauge. The first strain gauge and the second strain gauge are respectively disposed toward the same surface of the flexure element, via layers each of which has a different linear expansion coefficient.

7 Claims, 6 Drawing Sheets

SENSOR MODULE AND STRAIN DETECTING DEVICE

TECHNICAL FIELD

The present invention relates to a sensor module and a strain detecting device.

BACKGROUND ART

Various sensor modules are known to detect strain in flexure elements. For example, a sensor module includes a first strain gauge, a second strain gauge, and a third strain gauge that are formed on one gauge base, and the first strain gauge, the second strain gauge, and the third strain gauge are disposed in this order so as to be apart from one together, at an offset by 45 degrees. The first strain gauge, the second strain gauge, and the third strain gauge have different linear expansion coefficients. In such a sensor module, strain in an anisotropic material, of which the linear expansion coefficient differs depending on the direction of the material, can be detected (see, for example, Patent document 1).

RELATED-ART DOCUMENT

Patent Document

[Patent document 1] Japanese Unexamined Patent Application Publication No. H4-369403

SUMMARY

However, in the conventional sensor module including strain gauges, temperatures cannot be measured.

In view of the point described above, an object of the present invention is to allow a sensor module with strain gauges to measure a temperature.

A sensor module includes a first strain gauge including a first resistor; a second strain gauge including a second resistor; and a flexure element. The first strain gauge has a same characteristic as the second strain gauge. The first strain gauge and the second strain gauge are respectively disposed toward a same surface of the flexure element, via layers each of which has a different linear expansion coefficient.

Effect of the Invention

According to the disclosed technique, in a sensor module with strain gauges, a temperature can be measured.

DESCRIPTION OF EMBODIMENTS

One or more embodiments will be described below with reference to the drawings. In each figure, the same numerals denote the same components, and accordingly, duplicative description thereof may be omitted.

First Embodiment

Figure 1:
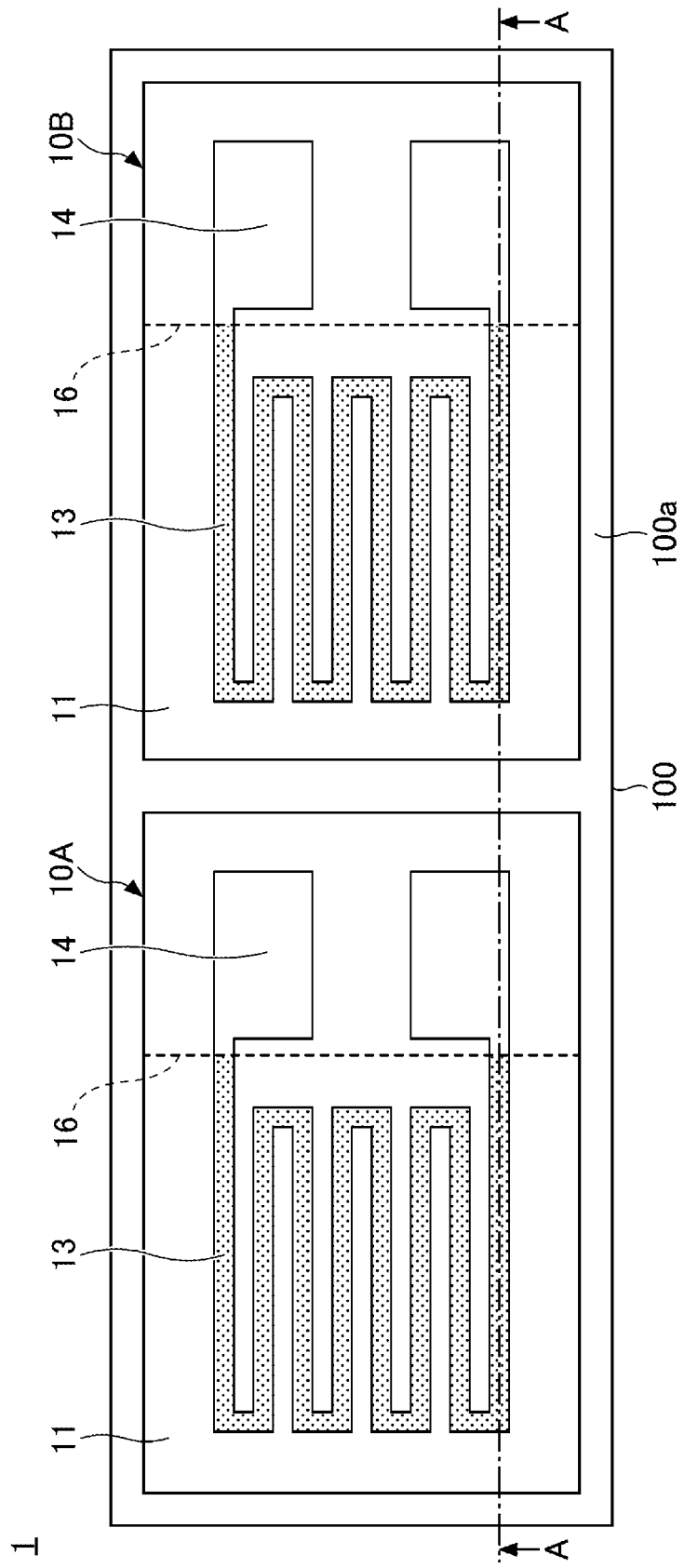
FIG. 1 is a plan view of an example of a sensor module according to a first embodiment.
Figure 2:
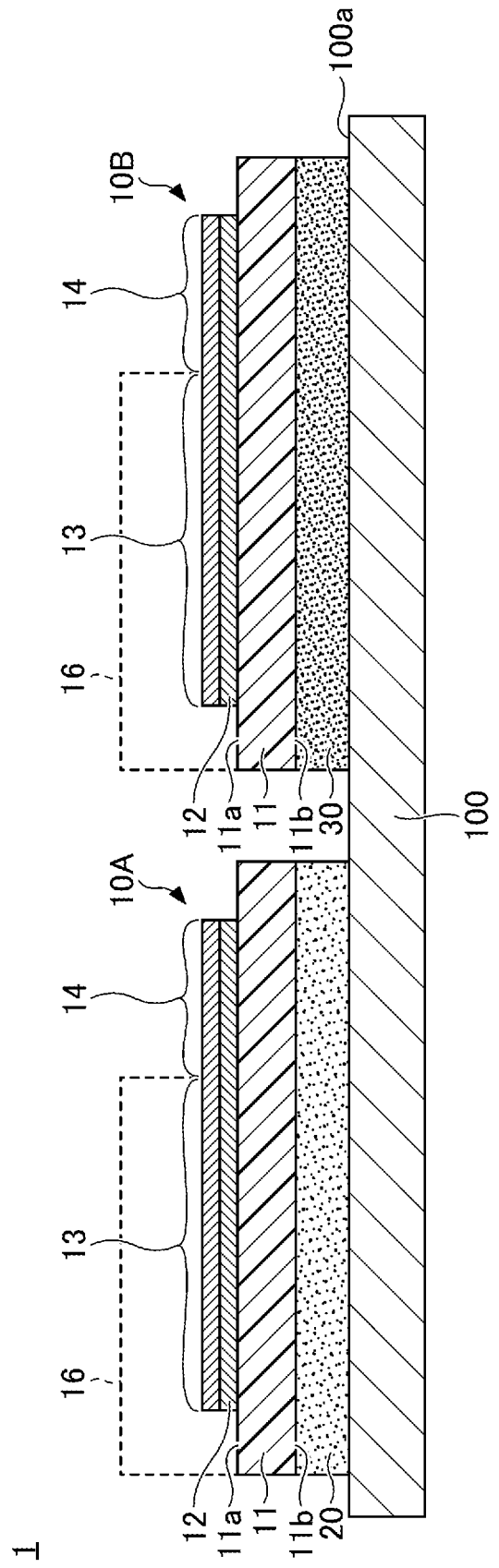
FIG. 2 is a cross-sectional view of an example of the sensor module according to the first embodiment.

FIG. 1 is a plan view of an example of a sensor module according to a first embodiment, and illustrates a sensor module 1 when viewed from the direction normal to an upper surface 100a of a flexure element 100. FIG. 2 is a cross-sectional view of an example of the sensor module according to the first embodiment, and illustrates a cross section taken along the A-A line in FIG. 1. In FIG. 1, illustration of a cover layer 16 is simplified, and only a portion of the cover layer is expressed by dashed lines.

Referring to FIG. 1 and FIG. 2, the sensor module 1 includes a strain gauge 10A, a strain gauge 10B, adhesive layers 20 and 30, and the flexure element 100.

The strain gauge 10A and the strain gauge 10B are disposed toward the same surface of the flexure element 100. Specifically, the strain gauge 10A is secured to the upper surface 100a of the flexure element 100 through the adhesive layer 20. The strain gauge 10B is secured to the upper surface 100a of the flexure element 100 through the adhesive layer 30.

Each of the strain gauges 10A and 10B is disposed such that a grid direction of the strain gauge is the same. When the grid direction of each strain gauge is the same, arrangement of the strain gauges 10A and 10B are not limited to the arrangement illustrated in FIG. 1. For example, the strain gauge 10A and the strain gauge 10B may be arranged in the vertical direction of the page, or may be arranged obliquely. Preferably, the strain gauges 10A and 10B are arranged to an extent possible to be close to each other, when these gauges 10A and 10B detect strain or temperature in a narrow area.

Each of the strain gauges 10A and 10B includes a substrate 11, a functional layer 12, a resistor 13, terminal sections 14, and a cover layer 16. That is, for the sake of convenience, although the strain gauges 10A and 10B are expressed by different numerals, the strain gauges 10A and 10B are strain gauges having the same characteristics. In this description, the same characteristics indicates that when manufacture is performed based on the same design, substantially the same gauge factors, substantially the same gauge factor temperature coefficients TCS, and substantially the same temperature coefficients of resistance TCR are obtained. The same characteristics mean an extent to which manufacturing errors in the characteristics are tolerable.

In the present embodiment, for the sake of convenience, for the sensor module 1, the side of the sensor module 1 where the cover layers 16 of the strain gauges 10A and 10b are provided is referred to as an upper side or one side, and the side of the sensor module 1 situated toward the flexure element 100 is referred to as a lower side or another side. Also, for each component, the surface on the side where the cover layers 16 of the strain gauges 10A and 10b are provided is referred to as one surface or an upper surface, and the surface situated toward the flexure element 100 is referred to as another surface or a lower surface. However, the sensor module 1 can be used in a state of being upside down, or can be disposed at any angle. Further, a plan view means that an object is viewed from the direction normal to the upper surface 100a of the flexure element 100, and a planar shape refers to a shape of an object when viewed from the direction normal to the upper surface 100a of the flexure element 100.

The substrate 11 is a member that is a base layer for forming the resistor 13 or the like and is flexible. The thickness of the substrate 11 is not particularly restricted and can be appropriately selected for any purpose. For example, such a thickness can be approximately between 5 μm and 500 μm. In particular, when the thickness of the substrate 11 is between 5 μm and 200 μm, it is preferable in terms of dimension stability with respect to environment, and when the thickness is 10 μm or more, it is further preferable in terms of insulation.

The substrate 11 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. The film refers to a flexible member having a thickness of about 500 μm or less.

Here, the "formed of an insulating resin film" is not intended to preclude the substrate 11 from containing fillers, impurities, or the like in the insulating resin film. The substrate 11 may be formed of, for example, an insulating resin film containing fillers such as silica or alumina.

The functional layer 12 is formed, as a lower layer of the resistor 13, on the upper surface 11a of the substrate 11. In other words, a planar shape of the functional layer 12 is approximately the same as the planar shape of the resistor 13 illustrated in FIG. 1. The thickness of the functional layer 12 can be approximately between 1 nm and 100 nm, for example.

In the present application, the functional layer refers to a layer that has a function of promoting crystal growth of the resistor 13 that is at least an upper layer. The functional layer 12 preferably further has a function of preventing oxidation of the resistor 13 caused by oxygen and moisture included in the substrate 11, as well as a function of improving adhesion between the substrate 11 and the resistor 13. The functional layer 12 may further have other functions.

The insulating resin film that constitutes the substrate 11 contains oxygen and moisture. In this regard, particularly when the resistor 13 includes Cr (chromium), it is effective for the functional layer 12 to have a function of preventing oxidation of the resistor 13, because Cr forms an autoxidized film.

The material of the functional layer 12 is not particularly restricted as long as it is material having a function of promoting crystal growth of the resistor 13 that is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The resistor 13 is a thin film formed in a predetermined pattern and on the upper surface of the functional layer 12, and is a sensitive section where resistance varies in accordance with strain. In FIG. 1, for the sake of convenience, the resistor 13 is illustrated in a crepe pattern.

The resistor 13 can be formed of, for example, material including Cr (chromium); material including Ni (nickel); or material including both of Cr and Ni. In other words, the resistor 13 can be formed of material including at least one from among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide. A portion of the material that constitutes the functional layer 12 may also be diffused into the Cr composite film. In this case, the material that constitutes the functional layer 12, and nitrogen may form a compound. For example, when the functional layer 12 is formed of Ti, the Cr composite film may include Ti or TiN (titanium nitride).

The thickness of the resistor 13 is not particularly restricted and can be appropriately selected for any purpose. The thickness can be, for example, approximately between 0.05 μm and 2 μm. In particular, when the thickness of the resistor 13 is 0.1 μm or more, it is preferable in terms of improvement in crystallinity (e.g., crystallinity of α-Cr) of a crystal that constitutes the resistor 13. When the thickness of the resistor 13 is 1 μm or less, it is further preferable in terms of reduction in cracks of a given film caused by internal stress of the film that constitutes the resistor 13, or reduction in warp in the substrate 11.

With the resistor 13 being formed on the functional layer 12, the resistor 13 can be formed by a stable crystalline phase and thus stability of gauge characteristics (a gauge factor, a gauge factor temperature coefficient TCS, and a temperature coefficient of resistance TCR) can be improved.

For example, when the resistor 13 is the Cr composite film, in a case of providing the functional layer 12, the resistor 13 can be formed with α-Cr (alpha-chromium) as the main component. Because α-Cr has a stable crystalline phase, stability of the gauge characteristics can be improved. Here, a main component means that a target substance is 50% by weight or more of total substances that constitute the resistor. When the resistor 13 is the Cr composite film, the resistor 13 preferably includes α-Cr at 80% by weight or more, from the viewpoint of improving the gauge characteristics. Note that α-Cr is Cr having a bcc structure (body-centered cubic structure).

Also, by diffusing a metal (e.g., Ti) that constitutes the functional layer 12 into the Cr composite film, the gauge characteristics can be improved. Specifically, the gauge factor of each of the strain gauges 10A and 10B can be 10 or more, as well as the gauge factor temperature coefficient TCS and temperature coefficient of resistance TCR being able to be each in the range of from −1000 ppm/° C. to +1000 ppm/r.

The terminal sections 14 respectively extend from both end portions of the resistor 13 and are each wider than the resistor 13 to be formed to have an approximately rectangular shape, in a plan view. The terminal sections 14 are a pair of electrodes via which changes in a resistance value of the resistor 13 in accordance with strain are output externally, where, for example, a lead wire for an external connection, or the like is joined. For example, the resistor 13 extends from one of the terminal sections 14, with zigzagged hairpin turns, to be connected to another terminal section 41. The upper surface of each terminal section 41 may be coated with a metal allowing for greater solderability than the terminal section 41. For the sake of convenience, the resistor 13 and the terminal sections 14 are expressed by different numerals. However, the resistor and the terminal sections can be integrally formed of the same material, in the same process.

The cover layer 16 is an insulating resin layer, which is disposed on and above the upper surface 11a of the substrate 11, such that the resistor 13 is coated and the terminal sections 14 are exposed. With the cover layer 16 being provided, mechanical damage and the like can be prevented from occurring in the resistor 13. Also, with the cover layer 16 being provided, the resistor 13 can be protected from moisture or the like.

The cover layer 16 can be formed of an insulating resin such as a PI resin, an epoxy resin, a PEEK resin, a PEN resin, a PET resin, or a PPS resin, a composite resin (e.g., a silicone resin or a polyolefin resin). The cover layer 16 may contain fillers or pigments. The thickness of the cover layer 16 is not particularly restricted and can be appropriately selected for any purpose. For example, the thickness may be approximately between 2 µm and 30 µm. In each of the strain gauges 10A and 10B, the cover layer 16 may be provided as necessary.

The adhesive layer 20 is disposed between the upper surface 100a of the flexure element 100 and the lower surface 11b of the substrate 11 for the strain gauge 10A. The adhesive layer 30 is also disposed between the upper surface 100a of the flexure element 100 and the lower surface 11b of the substrate 11 for the strain gauge 10B. The thickness of each of the adhesive layer 20 and adhesive layer 30 is not particularly limited and may be, for example, approximately in the range of 1 µm to 500 µm.

The adhesive layer 20 and the adhesive layer 30 are layers having different linear expansion coefficients. That is, when the temperature changes, expansion occurring in the adhesive layer 20 and the expansion occurring in the adhesive layer 30 differ from each other. In the strain gauge 10A, expansion occurring in the adhesive layer 20 can be detected as changes in a resistance value of the resistor 13 in the strain gauge 10A. Also, in the strain gauge 10B, expansion occurring in the adhesive layer 30 can be detected as changes in a resistance value of the resistor 13 in the strain gauge 10B.

A difference between a detected value by the strain gauge 10A and a detected value by the strain gauge 10B varies depending on ambient temperature of the sensor module 1. With this arrangement, when the sensor module 1 is coupled to an external circuit, and then the external circuit detects the difference between the detected value by the strain gauge 10A and the detected value by the strain gauge 10B, the ambient temperature of the sensor module 1 can be determined. That is, the sensor module 1 functions as a temperature sensor, in addition to functioning as a strain sensor.

For strain in the flexure element 100, each of the strain gauge 10A and the strain gauge 10B detects the same value. With this arrangement, even when the flexure element 100 distorts, the difference between the detected value by the strain gauge 10A and the detected value by the strain gauge 10B can be converted into a given temperature.

Examples of combinations of materials of the adhesive layer 20 and the adhesive layer 30 include, for example, epoxy-based adhesive (linear expansion coefficient ranging from 20 to 100 ppm/K), silicone-based adhesive (linear expansion coefficient ranging from 300 to 500 ppm/K), epoxy-based adhesive (linear expansion coefficient ranging from 20 to 100 ppm/K), cyanoacrylate (linear expansion coefficient ranging from 90 to 200 ppm/K), epoxy-based adhesive (linear expansion coefficient ranging from 20 to 100 ppm/K), urethane-based adhesive (linear expansion coefficient ranging from 100 to 200 ppm/K), and the like.

In order to manufacture the strain gauge 10A, the substrate 11 is first prepared and the functional layer 12 is formed on the upper surface 11a of the substrate 11. The material and thickness for each of the substrate 11 and the functional layer 12 are the same as the material and thickness described above. The functional layer 12 may be provided as necessary.

The functional layer 12 can be vacuum-deposited by, for example, conventional sputtering in which a raw material capable of forming the functional layer 12 is a target and in which an Ar (argon) gas is supplied to a chamber. By using conventional sputtering, the functional layer 12 is deposited while the upper surface 11a of the substrate 11 is etched with Ar. Thus, a deposited amount of film of the functional layer 12 is minimized and thus an effect of improving adhesion can be obtained.

However, this is an example of a method of depositing the functional layer 12, and the functional layer 12 may be formed by other methods. For example, before depositing the functional layer 12, the upper surface 11a of the substrate 11 is activated by plasma treatment or the like using Ar or the like to thereby obtain the effect of improving the adhesion; subsequently, the functional layer 12 may be vacuum-deposited by magnetron sputtering.

Then, the resistor 13 and the terminal sections 14 are formed on the entire upper surface of the functional layer 12, and then the functional layer 12, the resistor 13, and the terminal sections 14 are each patterned in the planar shape as illustrated in FIG. 1, by photolithography. The material and thickness for each of the resistor 13 and the terminal sections 14 are the same as the material and thickness described above. The resistor 13 and the terminal sections 14 can be integrally formed of the same material. The resistor 13 and the terminal sections 14 can be deposited by, for example, magnetron sputtering in which a raw material capable of forming the resistor 13 and the terminal sections 14 is the target. Instead of the magnetron sputtering, the resistor 13 and the terminal sections 14 may be deposited by reactive sputtering, vapor deposition, arc ion plating, pulsed laser deposition, or the like.

A combination of the material of the functional layer 12 and the material of the resistor 13 and the terminal sections 14 is not particularly restricted and can be appropriately selected for any purpose. For example, Ti is used for the functional layer 12, and a Cr composite film formed with α-Cr (alpha-chromium) as the main component can be deposited as the resistor 13 and the terminal sections 14.

In this case, each of the resistor 13 and the terminal sections 14 can be deposited by, for example, magnetron sputtering in which a raw material capable of forming the Cr composite film is the target and in which an Ar gas is supplied to a chamber. Alternatively, the resistor 13 and the terminal sections 14 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer 12 formed of Ti, and a Cr composite film that is formed with α-Cr as the main component having a stable crystalline structure can be deposited. Also, Ti that constitutes the functional layer 12 is diffused into the Cr composite film, so that the gauge characteristics are improved. For example, the gauge factor of the strain gauge 10A can be 10 or more, as well as the gauge factor temperature coefficient TCS and temperature coefficient of resistance TCR being able to be each in the range of from −1000 ppm/° C. to +1000 ppm/° C.

When the resistor 13 is a Cr composite film, the functional layer 12 formed of Ti includes all functions of a function of promoting crystal growth of the resistor 13; a function of preventing oxidation of the resistor 13 caused by oxygen or moisture contained in the substrate 11; and a function of improving adhesion between the substrate 11 and the resistor 13. Instead of Ti, when the functional layer 12 is formed of Ta, Si, Al, or Fe, the functional layer also includes the same functions.

Then, if necessary, the cover layer 16 is formed on and above the upper surface 11a of the substrate 11, such that the resistor 13 is coated and the terminal sections 14 are exposed, and thus the strain gauge 10A is completed. For example, the cover layer 16 can be fabricated, such that a thermosetting insulating resin film in a semi-cured state is laminated on the upper surface 11a of the substrate 11, and such that the resistor 13 is coated and the terminal sections 14 are exposed; subsequently, heat is added and curing is performed. The cover layer 16 may be formed such that a thermosetting insulating resin that is liquid or paste-like is applied to the upper surface 11a of the substrate 11, and such that the resistor 13 is coated and the terminal sections 14 are exposed; subsequently, heat is added and curing is performed.

As described above, when the functional layer 12 is provided in a lower layer of the resistor 13, crystal growth of the resistor 13 can be promoted, and thus the resistor 13 formed by a stable crystalline phase can be formed. As a result, in the strain gauge 10A, stability of the gauge characteristics can be improved. Also, the material that constitutes the functional layer 12 is diffused into the resistor 13, and thus the gauge characteristics of the strain gauge 10A can be improved. The strain gauge 10B can be fabricated by the same method as the strain gauge 10A.

When the sensor module 1 is fabricated, it is sufficient to secure the strain gauge 10A manufactured by the above-described method to the upper surface 100a of the flexure element 100 via the adhesive layer 20 and to secure the strain gauge 10B to the upper surface 100a of the flexure element 100 via the adhesive layer 30.

As described above, the sensor module 1 has a function of detecting ambient temperature, in addition to having a function of detecting strain in the flexure element 100. In each of the strain gauges 10A and 10B, when the resistor 13 is formed of a Cr composite film, high sensitivity (500% or more compared to conventional strain gauges) and a reduced size (1/10 or less compared to conventional strain gauges) can be provided. For example, the output of conventional strain gauges is about 0.04 mV/2 V, while the output of each of the strain gauges 10A and 10B is 0.3 mV/2 V or more. Further, the size for conventional strain gauges (gauge length×gauge width) is about 3 mm×3 mm, while the size of each of the strain gauges 10A and 10B (gauge length×gauge width) can be reduced to be about 0.3 mm×0.3 mm.

As described above, each of the strain gauges 10A and 10B that uses the Cr composite film as the material of the resistor 13 is made compact, and thus the entire sensor module 1 can be made compact. With this arrangement, the sensor module can be installed in an extremely small measurement point where the sensor module has not been used before. Also, each of the strain gauges 10A and 10B that uses the Cr composite film as the material of the resistor 13 is highly sensitive and thus minute displacement can be detected. Micro distortion, which was difficult to be detected in the past, can be detected. That is, the sensor module 1 that is capable of detecting strain accurately can be implemented with use of the strain gauges 10A and 10B each of which employs the Cr composite film as the material of the resistor 13. With this arrangement, the sensor module 1 can also detect the temperature with high accuracy.

First Modification of the First Embodiment

A first modification of the first embodiment provides an example of the sensor module in which a layer disposed between the strain gauge 10A and the flexure element differs from a layer disposed between the strain gauge 10B and the flexure element. In the first modification of the first embodiment, description for the same components as those described in the embodiment may be omitted.

Figure 3:
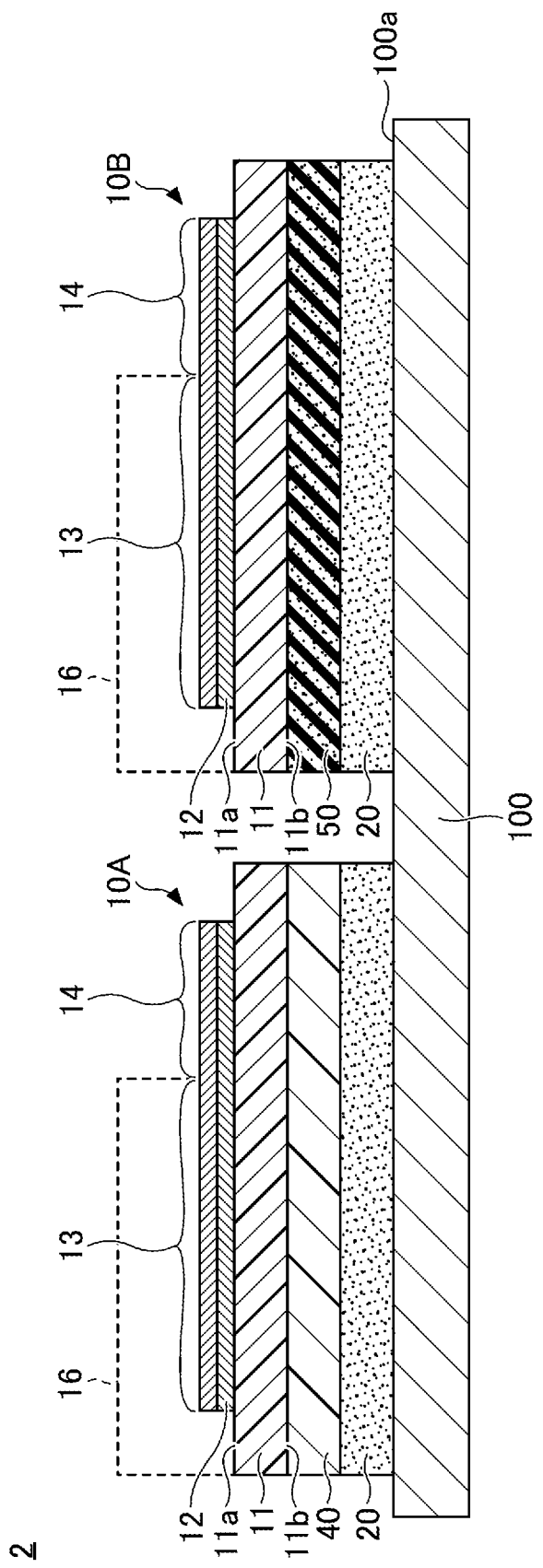
FIG. 3 is a cross-sectional view of an example of the sensor module according to a first modification of the first embodiment.

FIG. 3 is a cross-sectional view of an example of the sensor module according to the first modification of the first embodiment, and illustrates a cross section corresponding to the A-A line in FIG. 1. The planar shape is the same as that illustrated in FIG. 1, and accordingly, illustration viewed in a plan view is omitted.

Referring to FIG. 3, a sensor module 2 differs from the sensor module 1 (see FIG. 1 and FIG. 2) in that a moisture sensitive layer 40 is additionally provided below the strain gauge 10A and a moisture sensitive layer 50 is additionally provided below the strain gauge 10B. The sensor module 2 also differs from the sensor module 1 (see FIGS. 1 and 2) in that each adhesive layer 20 having the same linear expansion coefficient is used, instead of the adhesive layers 20 and 30.

The strain gauge 10A is disposed over the upper surface 100a of the flexure element 100, via the adhesive layer 20 and the moisture sensitive layer 40. The strain gauge 10B is disposed over the upper surface 100a of the flexure element 100, via the adhesive layer 20 and the moisture sensitive layer 50.

The moisture sensitive layer 40 is disposed between one adhesive layer 20 and the lower surface 11b of the substrate 11 in the strain gauge 10A. The moisture sensitive layer 50 is disposed between another adhesive layer 20 and the lower surface 11b of the substrate 11 in the strain gauge 10B. The thickness of each of the moisture sensitive layer 40 and the moisture sensitive layer 50 is not particularly limited and may be, for example, approximately between 0.1 μm and 500 μm.

The moisture sensitive layer 40 and the moisture sensitive layer 50 are layers having different linear expansion coefficients. That is, when the temperature changes, expansion occurring in the moisture sensitive layer 40 differs from expansion occurring in the moisture sensitive layer 50. The strain gauge 10A can detect the expansion occurring in the moisture sensitive layer 40 as changes in a resistance value of the resistor 13 in the strain gauge 10A, and the strain gauge 10B can detect the expansion occurring in the moisture sensitive layer 50 as changes in a resistance value of the resistor 13 in the strain gauge 10B.

A difference between a detected value by the strain gauge 10A and a detected value by the strain gauge 10B varies depending on the ambient temperature of the sensor module 2. Thus, when the sensor module 2 is connected to an external circuit, and then the external circuit determines the difference between the detected value by the strain gauge 10A and the detected value by the strain gauge 10B, the ambient temperature of the sensor module 2 can be determined. That is, the sensor module 2 functions as a temperature sensor, as in the sensor module 1.

Each of the strain gauge 10A and the strain gauge 10B detects the same value for strain in the flexure element 100. With this arrangement, even when the flexure element 100 distorts, the difference between the detected value by the strain gauge 10A and the detected value by the strain gauge 10B can be converted into a given temperature.

Examples of combinations of materials of the moisture sensitive layer 40 and the moisture sensitive layer 50 include, for example, glass (linear expansion coefficient ranging from 0.6 to 9 ppm/K), aluminum (linear expansion coefficient of 23.8 ppm/K), aluminum oxide (linear expansion coefficient of 7.2 ppm/K), iron (linear expansion coefficient of 11 ppm/K), chromium (linear expansion coefficient of 8.2 ppm/K), and copper (linear expansion coefficient of 16.5 ppm/K), and the like. Other transition metals, semiconductors, or compounds thereof can be selected as appropriate.

When the sensor module 2 is fabricated, it is sufficient to secure the strain gauge 10A manufactured by the aforementioned method to the upper surface 100a of the flexure element 100, via the adhesive layer 20 and the moisture sensitive layer 40, and to secure the strain gauge 100B to the upper surface 100a of the flexure element 100 via the adhesive layer 20 and the moisture sensitive layer 50. When the adhesive layer 20 to which the strain gauge 10A is secured has the same linear expansion coefficient as that of the adhesive layer 20 to which the strain gauge 10B is secured, it is sufficient. The material of the adhesive layer 20 is not limited to the material illustrated as an example of the material of the adhesive layer 20 described in the first embodiment.

As described above, the sensor module 2 has a function of detecting the ambient temperature, in addition to a function of detecting strain in the flexure element 100. It is preferable that the resistor 13 is formed of a Cr composite film in each of the strain gauges 10A and 10B, as in the first embodiment.

Second Modification of the First Embodiment

A second modification of the first embodiment provides another example of the sensor module in which a layer disposed between the strain gauge 10A and the flexure element differs in a layer disposed between the strain gauge 10B and the flexure element. In the second modification of the first embodiment, description for the same components as those described in the embodiments may be omitted.

Figure 4:
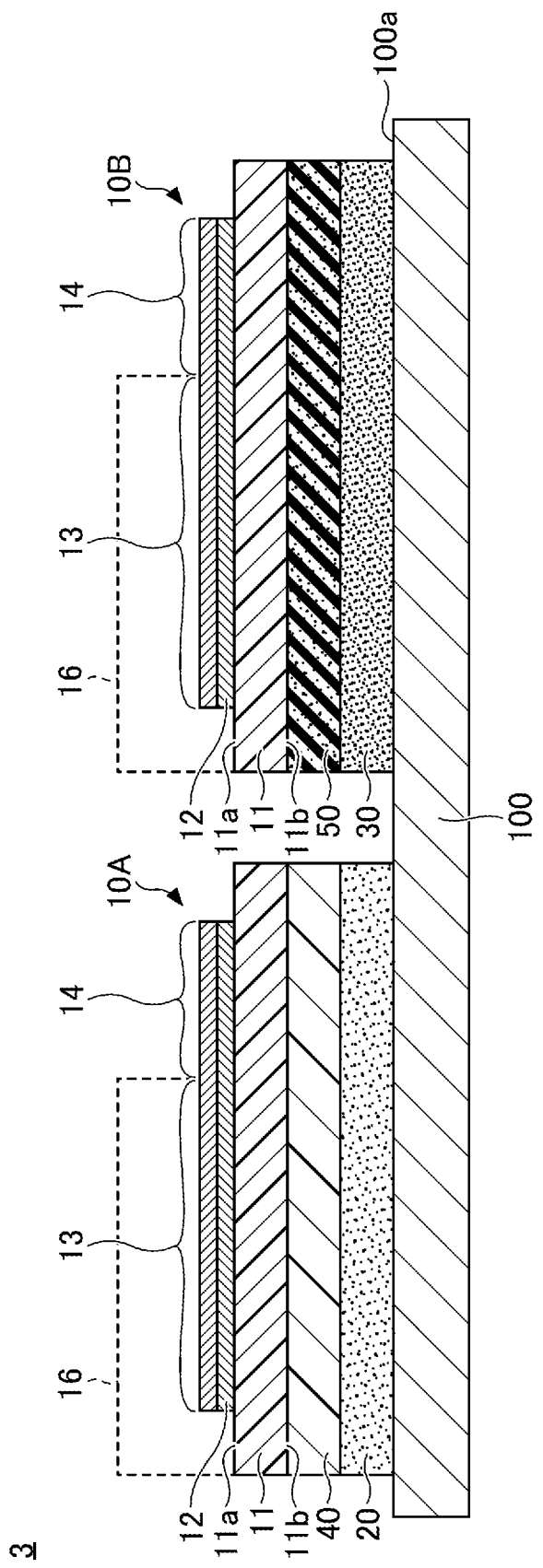
FIG. 4 is a cross-sectional view of an example of the sensor module according to a second modification of the first embodiment.

FIG. 4 is a cross-sectional view of the sensor module according to the second modification of the first embodiment, and illustrates a cross section corresponding to the A-A line in FIG. 1. The planar shape is the same as that illustrated in FIG. 1, and accordingly, illustration viewed in a plan view is omitted.

Referring to FIG. 4, a sensor module 3 differs from the sensor module 2 (see FIG. 3) in that a linear expansion coefficient of an adhesive layer to which the strain gauge 10A is secured is different from that of an adhesive layer to which the strain gauge 10B is secured.

The strain gauge 10A is disposed over the upper surface 100a of the flexure element 100, via the adhesive layer 20 and the moisture sensitive layer 40. Also, the strain gauge 10B is disposed over the upper surface 100a of the flexure element 100, via the adhesive layer 30 and the moisture sensitive layer 50. The adhesive layer 20 and the adhesive layer 30 are layers having different linear expansion coefficients, as in the first embodiment.

That is, in the sensor module 3, the adhesive layer 20 and the adhesive layer 30 are layers having different linear expansion coefficients, and the moisture sensitive layer 40 and the moisture sensitive layer 50 are layers having different linear expansion coefficients. For example, the linear expansion coefficient of the adhesion layer 30 is greater than the linear expansion coefficient of the adhesive layer 20, and the linear expansion coefficient of the moisture sensitive layer 50 is greater than the linear expansion coefficient of the moisture sensitive layer 40.

With this arrangement, in the sensor module 3, when the same temperature is obtained, a difference between a detected value by the strain gauge 10A and a detected value by the strain gauge 10B is increased in comparison to a case where the sensor module 1 or the sensor module 2 is used. As a result, temperatures can be detected more accurately. In each of the strain gauges 10A and 10B, it is preferable that the resistor 13 is formed of a Cr composite film, as in the first embodiment and the first modification.

Second Embodiment

A second embodiment provides an example of a strain detecting device that uses the sensor module 1. In the second embodiment, description for the same components as those described in the embodiments may be omitted.

Figure 5:
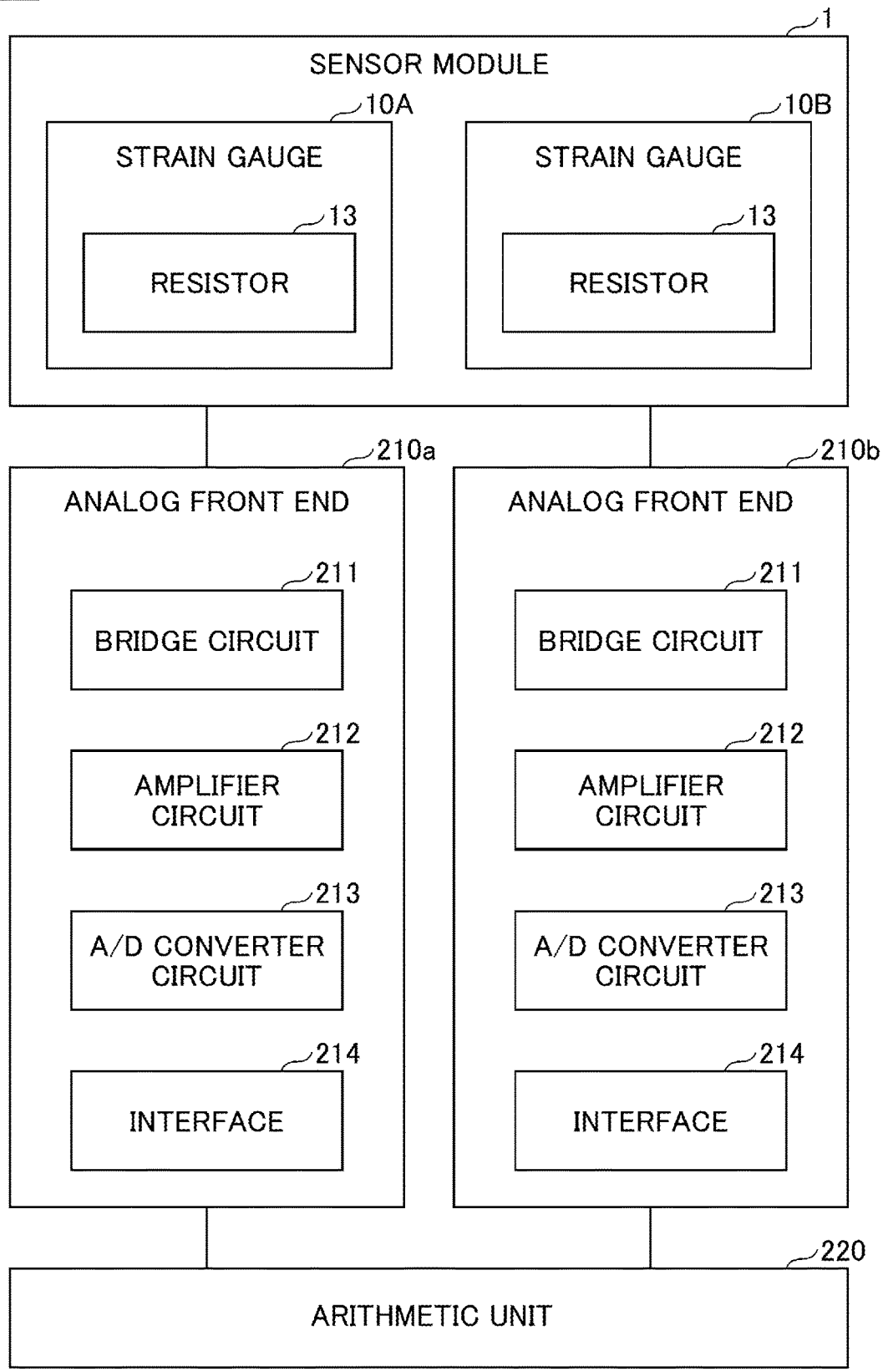
FIG. 5 is a block diagram illustrating an example of a strain detecting device according to a second embodiment.

FIG. 5 is a block diagram illustrating an example of a strain detecting device according to the second embodiment. Referring to FIG. 5, a strain detecting device 200 includes the sensor module 1, analog front ends 210a and 210b, and an arithmetic unit 220.

In the strain detecting device 200, a pair of terminal sections 14 of the strain gauge 10A in the sensor module 1 is connected to the analog front end 210a by using, for example, a flexible substrate, a lead wire, or the like.

The analog front end 210a includes, for example, a bridge circuit 211, an amplifier circuit 212, an A/D converter circuit (analog-to-digital converter circuit) 213, an interface 214, and the like, and generates a first distorted voltage based on the output of the resistor 13. The analog front end 210a may be constituted by one or more ICs, or may be configured by individual components.

In the analog front end 210a, for example, the pair of terminal sections 14 in the strain gauge 10A is connected to the bridge circuit 211. In other words, one side of the bridge circuit 211 is constituted by the resistor 13 between the pair of terminal sections 14, and the other three sides are each constituted by fixed resistance. With this arrangement, the first distorted voltage (analog signal) corresponding to a resistance value of the resistor 13 can be obtained as the output of the bridge circuit 211. The analog front end 210a is a representative example of a voltage generator according to the present invention.

In the analog front end 210a, after the first distorted voltage output from the bridge circuit 211 is amplified by the amplifier circuit 212, the amplified first distorted voltage is converted into a digital signal by the A/D converter circuit 213. Then, the digital signal is output to the arithmetic unit 220 through the interface 214 by serial communication such as $I^2C$.

The pair of terminal sections 14 of the strain gauge 10B in the sensor module 1 is connected to the analog front end 210b by using, for example, a flexible substrate, a lead line, or the like.

The analog front end 210b has the same function as the analog front end 210a, and generates a second distorted voltage based on the output of the resistor 13 in the strain gauge 10B. The analog front end 210b, as well as the analog front end 210a, may be formed as one IC.

In the analog front end 210b, for example, the pair of terminal sections 14 in the strain gauge 10B is connected to a bridge circuit 211. In other words, one side of the bridge circuit 211 is constituted by the resistor 13 between the pair of terminal sections 14, and the other three sides are each constituted by fixed resistance. With this arrangement, the second distorted voltage (analog signal) corresponding to a resistance value of the resistor 13 can be obtained as the output of the bridge circuit 211. The analog front end 210b is a representative example of a voltage generator according to the present invention.

In the analog front end 210b, after the second distorted voltage output from the bridge circuit 211 is amplified by an amplifier circuit 212, the amplified second distorted voltage is converted into a digital signal by an A/D converter circuit 213. Then, the digital signal is output to the arithmetic unit 220 through an interface 214 by serial communication such as I²C.

The arithmetic unit 220 performs arithmetic processing with respect to digitized first and second distorted voltages that are respectively transmitted from the analog front ends 210a and 210b, and then detects ambient temperature of the sensor module 1. Also, the arithmetic unit 220 performs arithmetic processing with respect to digitized first and second distorted voltages that are respectively transmitted from the analog front ends 210a and 210b, and then detects strain in the flexure element 100.

Figure 6:
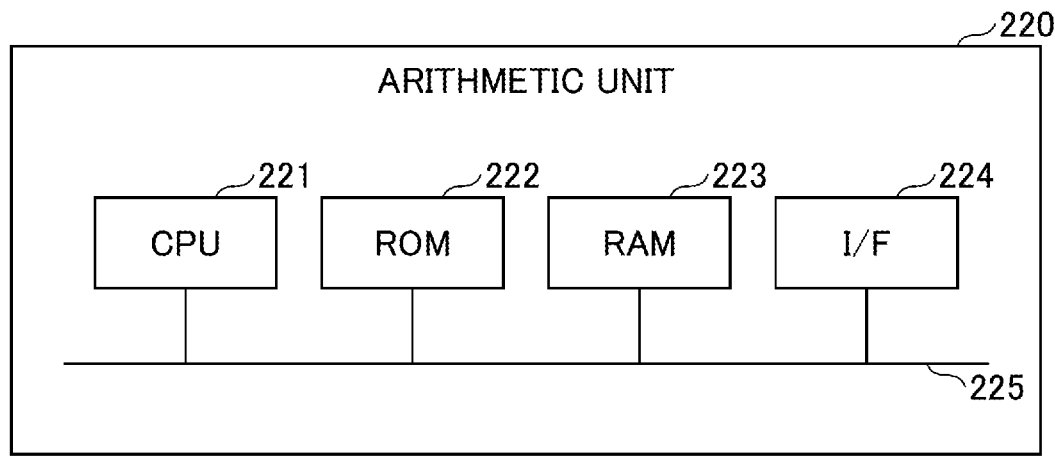
FIG. 6 is a hardware block of an example of an arithmetic unit according to the second embodiment.

FIG. 6 is a hardware block diagram of an example of the arithmetic unit according to the second embodiment. As illustrated in FIG. 6, the arithmetic unit 220 includes main components that are a central processing unit (CPU) 221, a read only memory (ROM) 222, a random access memory (RAM) 223, an interface (I/F) 224, and a bus line 225. The CPU 221, the ROM 222, the RAM 223, and the I/F 224 are interconnected via the bus line 225. The arithmetic unit 220 may have another hardware block as necessary.

The CPU 221 controls each function of the arithmetic unit 220. The ROM 222, which is a storage device, stores a program that causes the CPU 221 to control each function of the arithmetic unit 220, as well as storing various information. The RAM 223, which is a storage device, is used as a work area or the like of the CPU 221. The RAM 223 can temporarily store predetermined information. The I/F 224 is an interface for coupling to another device or the like. For example, the I/F 224 is coupled with the analog front ends 210a and 210b, an external network, or the like.

The arithmetic unit 220 may be a processor programmed to implement each function by software, as in a processor that is implemented by an electronic circuit. The arithmetic unit 220 may include an application specific integrated circuit (ASIC) designed to implement a predetermined function. The arithmetic unit 220 may include a digital signal processor (DSP), a field programmable gate array (FPGA), a system on a chip (SOC), or a graphics processing unit (GPU). The arithmetic unit 220 may be a circuit module or the like.

Figure 7:
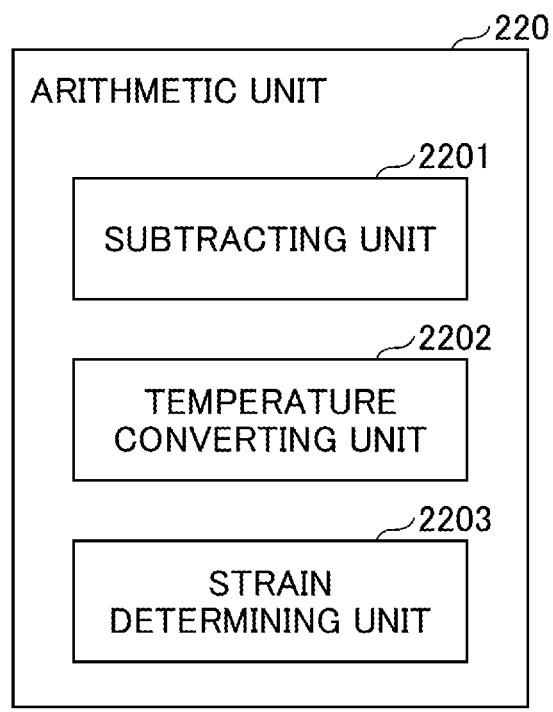
FIG. 7 is a functional block of an example of the arithmetic unit according to the second embodiment.

FIG. 7 is a functional block diagram of an example of the arithmetic unit according to the second embodiment. As illustrated in FIG. 7, the arithmetic unit 220 includes main functional blocks that are a subtracting unit 2201, a temperature converting unit 2202, and a strain determining unit 2203. The arithmetic unit 220 may include another functional block as necessary.

The subtracting unit 2201 has a function of subtracting the second distorted voltage from the first distorted voltage that is digitalized, to thereby generate a difference voltage (absolute value) between the first distorted voltage and the second distorted voltage. The temperature converting unit 2202 includes a function of converting the difference voltage generated by the subtracting unit 2201, into a temperature.

For example, with use of simulation or experiments, a conversion table that is used to convert a difference voltage, which the subtracting unit 2201 generates, into a temperature is created in advance, and then is stored in a non-volatile memory or the like. In this case, a temperature converting unit 2202 can convert the difference voltage, which the subtracting unit 2201 generates, into a given temperature, by referring to the conversion table stored in the non-volatile memory or the like. The temperature converting unit 2202 may externally output data of the temperature obtained after conversion, as necessary.

The strain determining unit 2203 has a function of performing temperature compensation for each of the first distorted voltage and the second distorted voltage, based on the temperature obtained after conversion performed by the temperature converting unit 2202. When the flexure element 100 distorts, the first distorted voltage and the second distorted voltage include information about strain that is caused by expansion of the adhesive layers 20 and 30 and about strain in the flexure element 100.

As described above, the linear expansion coefficient of each of the adhesive layers 20 and 30, and the temperature are known, and thus the strain determining unit 2203 can determine strain that is caused by expansion of the adhesive layers 20 and 30 and is derived from the first distorted voltage and second distorted voltage. As a result, the strain determining unit 2203 can also determine strain, in the flexure element 100, that is derived from the first distorted voltage and second distorted voltage.

Further, the sensor module 1 can measure both a temperature change and strain occurring in the flexure element, and thus the strain determining unit 2203 can perform temperature compensation for the determined strain in the flexure element 100. That is, errors in the strain occurring in the flexure element 100, depending on a resistance temperature coefficient of each of the resistor 13 in the strain gauge 10A and the resistor 13 in the strain gauge 10B, are corrected, and thus strain, in the flexure element 100, that needs to be detected as such can be obtained with high accuracy. An example of calculation is described below.

In this description, as an example, when a bridge circuit used in a single element is considered, Equations (1) to (3) below are satisfied.

$$e/E = \tfrac{1}{4} \times k \cdot \varepsilon \tag{1}$$

$$TCR = \Delta R/R \times 1/\Delta T \times 10^6 \tag{2}$$

$$\Delta R/R = k \cdot \varepsilon \tag{3}$$

In Equations (1) to (3), E is a voltage applied to the bridge circuit, e is a distorted voltage (output voltage), k is a gauge factor, and s is strain.

In the sensor module 1, in a case where a temperature change $\Delta T$ is obtained, if $\varepsilon_1$ is strain detected by the strain gauge 10A and $\varepsilon_2$ is strain detected by the strain gauge 10B, $\varepsilon_1$ and $\varepsilon_2$ can be respectively expressed by Equations (4) and (5), in consideration of Equations (1) to (3).

$$\varepsilon_1 = \varepsilon_0 + \varepsilon_{T1} = \varepsilon_0 + \Delta T \times TCR_1 \tag{4}$$

$$\varepsilon_2 = \varepsilon_0 + \varepsilon_{T2} = \varepsilon_0 + \Delta T \times TCR_2 \tag{5}$$

In Equations (4) and (5), $\varepsilon_0$ is strain that occurs in a given flexure element, $\varepsilon_{T1}$ is strain that occurs in the strain gauge 10A in accordance with the temperature change $\Delta T$, $\varepsilon_{T2}$ is strain that occurs in the strain gauge 10B in accordance with the temperature change $\Delta T$, $TCR_1$ is a resistance temperature coefficient of the strain gauge 10A, and $TCR_2$ is a resistance temperature coefficient of the strain gauge 10B.

When Equations (4) and (5) are modified in consideration of Equation (1), Equations (6) and (7) below are obtained.

$$e_1/E = \tfrac{1}{4} \times k_1 (\varepsilon_0 + \Delta T \times TCR_1) \qquad (6)$$

$$e_2/E = \tfrac{1}{4} \times k_2 (\varepsilon_0 + \Delta T \times TCR_2) \qquad (7)$$

In Equations (6) and (7), $e_1$ is an output voltage of the strain gauge 10A, $e_2$ is an output voltage of the strain gauge 10B, $k_1$ is a gauge factor of the strain gauge 10A, and $k_2$ is a gauge factor of the strain gauge 10B.

In this description, $e_1$, $e_2$, $E$, $k_1$, $k_2$, $TCR_1$, and $TCR_2$ are known, and thus Equations (8) and (9) below are obtained.

$$\Delta T = (4/k_1 \cdot k_2) \times (e_1 \cdot k_2/E - e_2 \cdot k_1/E)/(TCR_1 - TCR_2) \qquad (8)$$

$$\varepsilon_0 = (4/k_1 \cdot k_2) \times (e_2 \cdot TCR_1 \cdot k_1/E - e_1 \cdot TCR_2 \cdot k_2/E)/(TCR_1 - TCR_2) \qquad (9)$$

That is, when the sensor module 1 is used, both the temperature change $\Delta T$ and the strain $\varepsilon_0$ occurring in the flexure element can be measured. Therefore, the strain determining unit 2203 can perform temperature compensation for a determined strain $\varepsilon_0$ in the flexure element 100.

Although the preferred embodiments and the like have been described above in detail, there is no limitation to the above embodiments and the like. Various modifications and substitutions to the embodiments described above can be made without departing from a scope set forth in the claims.

This international application claims priority under Japanese Patent Application No. 2019-161965, filed Sep. 5, 2019, the contents of which are incorporated herein by reference in their entirety.

REFERENCE SIGNS LIST 1, 2, 3 sensor module, 10A, 10B strain gauge, 11 substrate, 11a upper surface, 11b lower surface, 12 functional layer, 13 resistor, 14 terminal section, 16 cover layer, 20, 30 adhesive layer, 40, 50 moisture sensitive layer, 100 flexure element, 200 strain detecting device, 210a, 210b analog front end, 211 bridge circuit, 212 amplifier circuit, 213 A/D converter circuit, 214 interface, 220 arithmetic unit, 2201 subtracting unit, 2202 temperature converting unit, 2203 strain determining unit

The invention claimed is:

1. A sensor module comprising:
   a first strain gauge including a first resistor;
   a second strain gauge including a second resistor; and
   a flexure element,
   wherein the first strain gauge has a same characteristic as the second strain gauge, and
   wherein the first strain gauge and the second strain gauge are respectively disposed toward a same surface of the flexure element, via layers each of which has a different linear expansion coefficient.

2. The sensor module according to claim 1, wherein the first strain gauge is disposed over the flexure element via a first adhesive layer,
   wherein the second strain gauge is disposed over the flexure element via a second adhesive layer, and
   wherein the layers each of which has the different linear expansion coefficient include the first adhesive layer and the second adhesive layer.

3. The sensor module according to claim 1,
   wherein the first strain gauge is disposed over the flexure element via a first adhesive layer and a first moisture sensitive layer,
   wherein the second strain gauge is disposed over the flexure element via a second adhesive layer and a second moisture sensitive layer,
   wherein the first adhesive layer has a same linear expansion coefficient as the second adhesive layer, and
   wherein the layers each of which has the different linear expansion coefficient include the first moisture sensitive layer and the second moisture sensitive layer.

4. The sensor module according to claim 1,
   wherein the first strain gauge is disposed over the flexure element via a first adhesive layer and a first moisture sensitive layer,
   wherein the second strain gauge is disposed over the flexure element via a second adhesive layer and a second moisture sensitive layer,
   wherein the layers each of which has the different linear expansion coefficient include
      the first adhesive layer and the second adhesive layer, and
      the first moisture sensitive layer and the second moisture sensitive layer, and
   wherein a linear expansion coefficient of the second adhesive layer is greater than a linear expansion coefficient of the first adhesive layer, and a linear expansion coefficient of the second moisture sensitive layer is greater than a linear expansion coefficient of the first moisture sensitive layer.

5. The sensor module according to claim 1, wherein each of the first resistor and the second resistor is formed of a Cr composite film.

6. A strain detecting device comprising:
   the sensor module according to claim 1;
   a voltage generator configured to generate a first distorted voltage based on an output of the first resistor and to generate a second distorted voltage based on an output of the second resistor; and
   a controller configured to
      subtract the second distorted voltage from the first distorted voltage to generate a difference voltage, and
      convert the difference voltage into a temperature.

7. The strain detecting device according to claim 6, wherein the controller is further configured to
   perform temperature compensation for the first distorted voltage and the second distorted voltage, based on the temperature converted from the difference voltage, and
   determine strain in the flexure element.

* * * * *